United States Patent Office 3,498,346
Patented Mar. 3, 1970

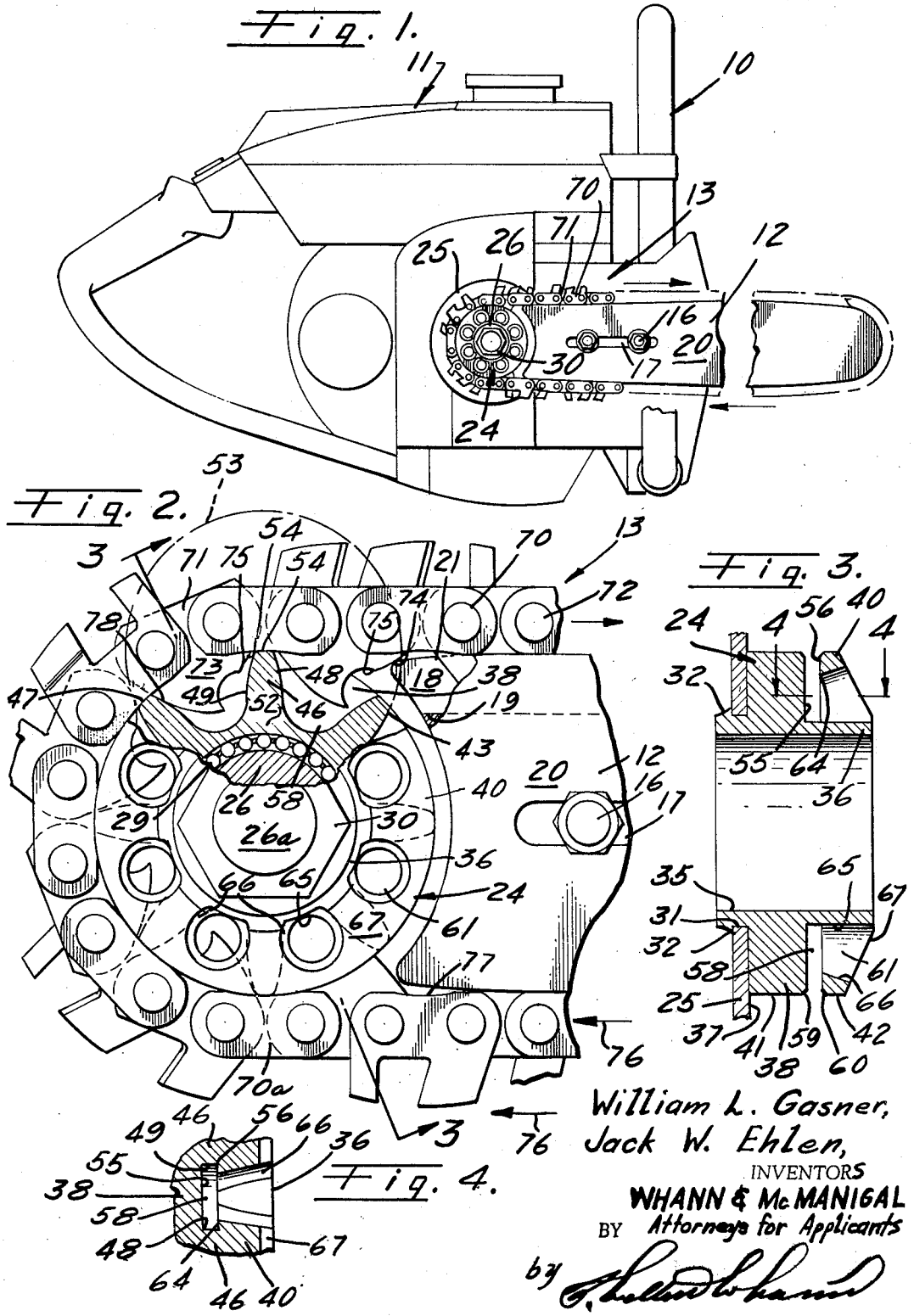

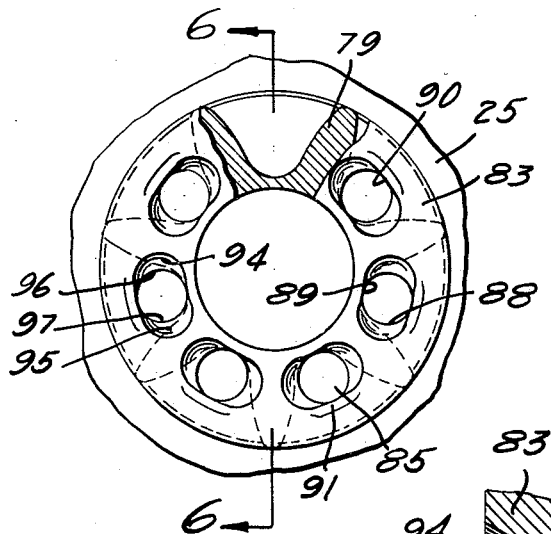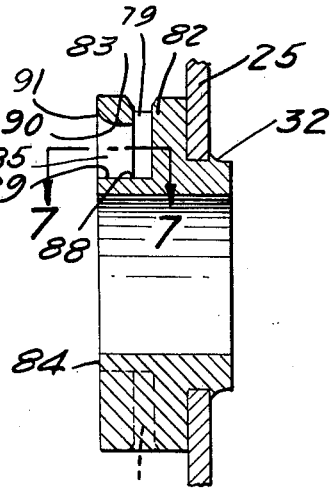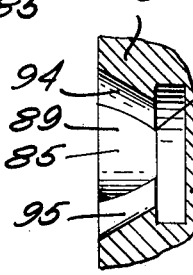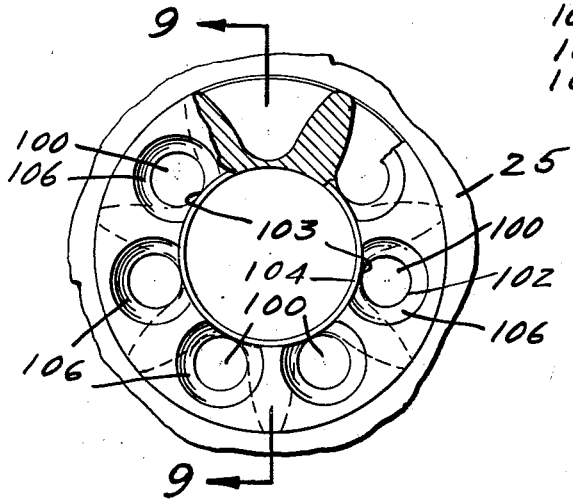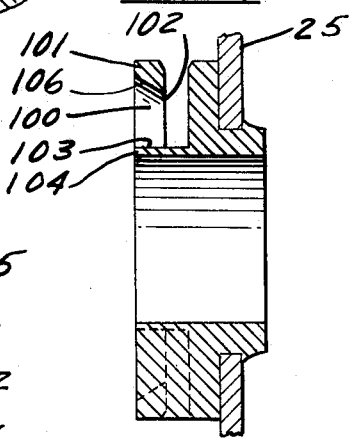

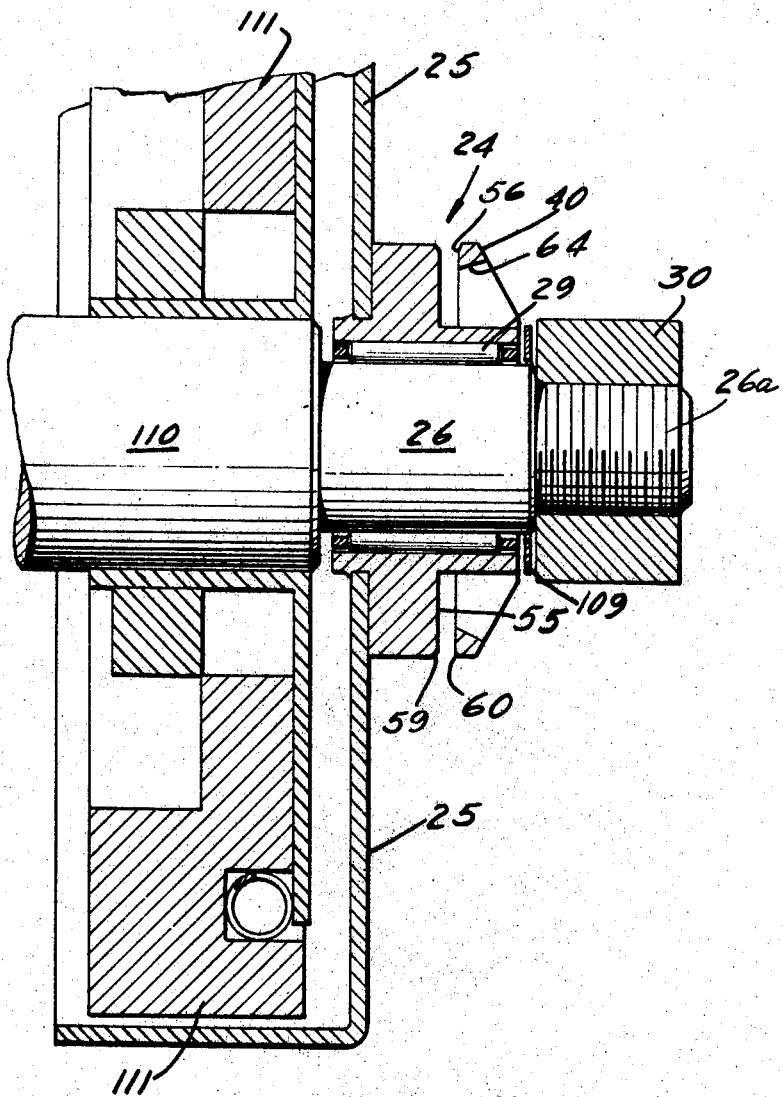

3,498,346
SPROCKET AND CHAIN FOR CHAIN SAW
William L. Gasner, Gardena, and Jack W. Ehlen, Torrance, Calif., assignors to McCulloch Corporation, Los Angeles, Calif., a corporation of Wisconsin
Filed Oct. 23, 1965, Ser. No. 502,995
Int. Cl. B27b 17/00
U.S. Cl. 143—32                                   5 Claims

ABSTRACT OF THE DISCLOSURE

A chain saw including a drive sprocket assembly provided with pockets for receiving drive tangs of a cutter chain. The pockets are provided with converging inlets and diverging discharge passages.

---

This invention relates to a sprocket drive mechanism for chains and, more particularly, to a sprocket drive mechanism for chain saws.

It is known that a saw chain undergoes severe wear on its supporting surfaces and on its linkage bearing points. As a result of this, the chain is out of its designed pitch a relatively short time after it has been put to use. When the driving sprocket is revolving, it is necessary for the chain tension to exceed the tooth force and the ejection force so that the system will retain its equilibrium. If the chain tension is relaxed, it follows that the system is thrown out of balance and the remaining forces, lacking the counterbalancing effect of chain tension, push the chain into the paths of minimum resistance.

It is customary for saw chains to be run with a certain amount of slackness and the slackness is transmitted to the sprocket area, especially when the chain is cutting; that is, the slackness is forced away from the cutting area because of the guide bar area pressuring the chain against the wood. The amount of slackness around the sprocket determines the extent of the tendency for the chain to be centrifugally ejected from the sprocket. In the conventional saw chain sprockets, which have straight-faced sprocket teeth, the tendency for the chain to be ejected is detrimental because it causes: (1) excessive wear on both the chain and sprockets; (2) intermittent shock loads as the chain constantly seeks to become nested, with an edge of a driven link against the straight face of the sprocket tooth; (3) rotation of the chain in an out-of-pitch condition; and (4) the driving force to be transferred to a new contact point on the crest of the tooth with a rocking action against the driven link.

According to the present invention, the sprocket teeth are curved from their roots to their crests or toes so that at all times, even when the chain is worn, and/or in a stretched condition, the contact of the driven link on the driving tooth is at a point of tangency. As a result, the driving force of the sprocket is transmitted to the driven link so that the driving force of the sprocket tooth is perpendicular to the line of tangency at the point of contact. This insures that the full force of the drive is conveyed to the chain. If the angle of force were to shift from that of perpendicular to the line of tangency, as it typically does with straight-faced sprocket teeth, so as to not be acting perpendicular to the driven member, much of the power would be dissipated along vectors in variance.

As the curve of the sprocket tooth is constant, as soon as the first contact is made by the tooth against a driven link, a tangential drive occurs. In contrast, on a straight-faced tooth, there is a delayed action while the driving tooth and the driven link seek and find a nested condition.

It is an object of the invention to provide an improved sprocket for driving a chain. This improvement is provided in part by the tangential driving contact described in the foregoing.

In a sprocket for a chain saw in which the sprocket teeth are spaced between two disc members, it is another object of the invention to provide means by which the tangs of the driven chain links are smoothly funneled into engagement with the sprocket teeth. This improvement is the result of chamfers on the inner peripheral edges of the disc members between which the sprocket teeth are spaced. This improvement also eliminates the need for a perfect alignment between the sprocket and the chain saw bar. Alignment is also improved by means of a floating mount for the sprocket.

It is still another object of the present invention, in the sprocket of the type described in the preceding paragraph, to provide greater sawdust conveyance out of the spaces between the sprocket teeth by means of openings in one of the disc members, adjacent the roots of the teeth. This aids in keeping the sprocket free of impacted sawdust and/or other foreign material.

It is a further object of the invention to provide a sprocket in which the wear on the sprocket teeth and chain are substantially reduced.

It is a still further object of the invention to provide a sprocket made by investment casting that can be secured to a cluch drum by soldering or brazing without the metal being annealed or having its physical properties otherwise undesirably affected. This not only benefits the sprocket, but the avoidance of having to heat treat it after attachment to the drum is of benefit to the latter in that heat treating would be detrimental to it. An example of such a metal is Ni-Hard (a trademark for a metal comprising approximately 2.90 percent carbon, 0.1 percent graphitic carbon, 0.40 to 0.70 percent silicon, 0.4 to 0.7 percent manganese, 0.15 percent sulphur, 4.00 to 4.75 percent nickel, 0.40 percent phosphorus, 1.40 to 3.50 percent chromium, and the remainder being iron). Other similar materials are Stellite-93, (trademark), Stellite-6 (trademark), and cast SAE-8620 steel. These materials also permit the sprocket to be used as the outer bearing race.

It is another further object of the invention to provide improved tangs on the driven chain links for use in combination with the sprocket of the type described in the preceding paragraphs. The improved tangs are relieved at their forward upper ends and this permits the use of a smaller diameter sprocket in that the relieving of the tang makes it possible to decrease the spaces between the sprocket teeth. It also provides easier and smoother entry into the groove of the chain saw bar. In addition, the relieved contour of the tang aids in keeping the bar groove clean, where otherwise chips and sawdust tend to be cammed downwardly into the groove.

Further objects and advantages of the invention may be brought out in the following part of the specification, wherein small details have been described for the competence of disclosure, without intending to limit the scope of the invention which is set forth in the appended claims.

Referring to the accompanying drawings, which are for illustrative purposes:

FIG. 1 is a fragmentary side elevational view of a chain saw embodying the present invention;

FIG. 2 is an enlarged fragmentary view of the saw chain driving assembly shown in FIG. 1;

FIG. 3 is a cross-sectional view of the driving sprocket assembly taken as indicated by the line 3—3 in FIG. 2;

FIG. 4 is a cross-sectional fragmentary view taken as indicated by the line 4—4 in FIG. 3;

FIG. 5 is an elevational view of a driving sprocket assembly of another embodiment of the invention;

FIG. 6 is a cross-sectional view taken as indicated by the line 6—6 in FIG. 5;

FIG. 7 is a fragmentary cross-sectional view taken as indicated by the line 7—7 in FIG. 6;

FIG. 8 is a side elevational view of a sprocket assembly illustrating still another form of the invention;

FIG. 9 is a cross-sectional view taken as indicated by the line 9—9 in FIG. 8; and FIG. 10 is a cross-sectional view of a sprocket assembly similar to that shown in FIG. 2, mounted upon a chain saw, illustrating floating alignment of the sprocket assembly in regard to the chain saw bar and chain.

Referring again to the drawings, there is illustrated in FIG. 1 a chain saw, generally designated as 10, having an engine and frame portion 11, a bar or blade 12, and an endless saw chain 13 which is driven by the engine and travels on the bar.

The bar 12 is adjustably secured to the engine 11 by bolts 16 extending through a slot 17 in the bar. The bar 12 is of the grooved type, as indicated in FIG. 2, formed of three laminated plates 18, 19 and 20. The outer plates 18 and 20 are coextensive and the center plate 19 is overlapped at its opposite transverse edges by the outer plates so as to form the groove 21 therebetween. The groove also extends over the nose, not shown, where the center plate is longitudinally shorter than the outer plates.

The chain is driven by a sprocket assembly, generally designated as 24, secured to a clutch drum 25 which is driven by an unshown clutch, when engaged, upon rotation of engine drive shaft 26, so as to rotate the clutch drum and the sprocket assembly. The clutch drum is rotatable independently of the shaft, the shaft and sprocket assembly being spaced from each other by means of a race of roller bearings 29. The sprocket assembly and clutch drum are secured to the chain saw engine by means of a nut 30 on a small diameter end 26a of the shaft 26.

As best seen in FIGS. 2 and 3, the sprocket assembly is made of one piece by investment casting and is hardened so as to permit the use of a loose fit roller bearing race, as indicated at 29. The sprocket assembly is secured to the clutch drum in a central opening 31 therein by means of a press fitting operation, or a staking operation, which forms nodules 32, overlapping the drum. To additionally secure the sprocket to the drum, the inner face of the latter may be brazed to the periphery of the flange 32.

A sprocket hub 36 is formed inwardly of the flange 32 and has a cylindrical opening 35 therethrough. Extending radially outwardly from the hub, in abutment with the outer face 37 of the drum, is an inner disc member 38 and spaced axially therefrom is an outer disc member 40, the disc members having the same diameters for their outer circumferential surfaces 41 and 42, respectively. Spaced between the disc members and extending radially outwardly from the hub is a sprocket wheel 43, having eight circumferentially spaced teeth 46, the sprocket wheel diameter being substantially equal to that of the disc members. The hub, disc members and sprocket wheel are integral, made in one casting.

The teeth have outer circumferential surfaces 47 at the toes and extending radially inwardly therefrom are convexly curved forward and rear surfaces 48 and 49, respectively. These curved surfaces join the circumferential toe surfaces 47 and extend inwardly to the roots 52 of the teeth. Looking at FIG. 2, the surfaces 48 and 49, extending in the axial direction, are formed of straight lines. The radii of surfaces 48 and 49 are that of the arc 53, shown at the top of FIG. 2, having its center at 54 on the circumferential surface of the vertically directed tooth 46 and on a center line of the sprocket assembly. For a 1½ inch diameter sprocket assembly, the radius of the arc 53 may be 0.610 of an inch.

Between the sprocket teeth are facing, flat disc surfaces 55 and 56, and for a 1½ inch diameter sprocket described, they may be spaced apart approximately 0.065 of an inch. These surfaces, with each two sprocket teeth, form the spaces indicated as 58. Extending between the teeth along the circumferential edges of the surfaces 55 and 56 are chamfered surfaces 59 and 60, respectively, formed at a 30 degree angle with the vertical in FIG. 3 and extending axially from the facing surfaces 55 and 56 a distance of approximately 0.015 of an inch. These chamfered surfaces provide for easy entry of the chain tangs between the teeth and disc members and eliminate the need for perfect alignment of the sprocket assembly with the chain saw bar.

As shown in FIGS. 3 and 4, extending axially outwardly of the spaces 58 between the teeth and through the outer disc member 40 are eight equally and circumferentially spaced openings 61. The inner portion 64 of each opening, at the face 56 of the disc member, is circular and has a diameter of about 0.218 of an inch. The radially inner portions of the circular portions 64 are formed substantially on the hub 36 between the roots of the teeth. The openings 61 have their centers on a circle concentric with the disc members and having a diameter of 1.093 inches.

Axially directed on the hub are generally cylindrical surfaces 65 of the openings 61. Radially outwardly from the surfaces 65, in each opening, is an axially directed, beveled surface 66 formed so as to increase the diameter of the openings 61 adjacent the outer surface 67 of the disc member 40. The surface 67 is beveled, radially outwardly of the hub, so as to reduce the axial thickness of the disc member 40 adjacent its periphery and so that the outer disc member has the appearance of an approximate truncated cone. By having the openings 61 increase in size toward the surface 67 and by reducing the thickness of the openings adjacent the circumference of the disc 40, sawdust formed between the sprocket teeth is easily removed therefrom. That is, the distance the sawdust must travel is reduced and the space into which it travels is enlarged as it moves toward the outer end of the latter. The angle of the bevel 66 is approximately 15 degrees with the horizontal and the angle of the bevel 67 is approximately 27 degrees with the vertical, as shown in FIG. 3. The limitation of the amount of the bevel 67 as well as the amount of the bevel 66 is determined by the strength of the material remaining in the outer disc 40 between the sprocket teeth.

As shown in FIGS. 1 and 2, the saw chain includes side links 70 and center links 71 connected consecutively by pintles 72. Extending inwardly on the center links are sprocket-engaging projections or tanks 73, being in the bar groove 21 while the side links ride on the outer peripheral edges of the outer plates of the bar 12.

At the forward and upper ends of the tangs there is a relieved surface 74, at an angle of 30 degrees with an imaginary line through a point 75 and which is parallel to the plane extending through the pintle axes of each center link, the line being 0.240 of an inch from the plane. This provides a shorter tang in the longitudinal direction so as to permit the sprocket teeth to be closer together and thereby permit a smaller diameter sprocket wheel. The relieved surface 74 also provides easier and smoother entry into the groove 21 in the chain saw bar. That is, if the inclined surface 74 makes contact with one of the side plates of the bar in its approach to the groove 21, the inclination causes the tank to move into the groove with greater ease than if a more blunt surface were prevented at the front end of the tank. Further, as chips and sawdust are normally cammed downwardly into the bar groove, the relieved surface 74 provides additional space between the groove base and the forward end of the center link so that the tang may more easily force the chips and sawdust from the groove.

To aid in positioning the chain radially on the sprocket assembly as the former moves toward the latter in the direction of the arrow 76, each side link 70 has a longitudinally arced, inwardly facing surface 77. The arced surfaces 77 have the same radii as the disc members 38 and 40, and when a pair of transversely aligned side links move to be fully engaged with the sprocket assembly as indicated by the side link 70a in FIG. 2, the center of the arc 77 and the center of the sprocket assembly become coincident. The surfaces 77 ride on the circumferential surfaces of the disc members 38 and 40 so as to maintain the chain links concentric with the sprocket assembly in a constant radial position with nonteetering movement.

As the individual tangs 73 engage the sprocket, they are funneled into the spaces between the teeth 46 by means of the chamfers 59 and 60 and this provides for a very easy and smooth engagement. As shown in FIG. 2, the tangs 73 are not in driven contact with the sprocket teeth until just prior to the position where the chain leaves the sprocket assembly. By having the drive occur as the chain leaves the sprocket, no interference is encountered as the chain enters into engagement with the sprocket. Thus, the engaging action is particularly smooth. This type of drive develops in a gradual approach; that is, as the sprocket teeth rotate, they gradually change their relative noncontacting position with the tank ahead of them until contact finally occurs just before the chain leaves the sprocket. This contact, since the teeth surfaces are curved, is at one tangential point, as 78. Here, the driving force of the sprocket is transmitted perpendicular to the line of tangency so as to insure that the full force of the drive is conveyed to the chain at the point of tangency. Because the curve of the teeth is constant, as soon as the first contact is made with a tooth against the driven link, it immediately begins the tangential drive. This eliminates the delayed action which occurs when a straight-edge tooth and tang seek to find a nested condition. It further eliminates an in-and-out or rocking movement of the chain before the nesting occurs.

Thus, as the chain on the sprocket assembly remains in a constant radial position with the side links having their surfaces 77 engaged with the circumferential surfaces of the disc members, there are substantially no variations in pressure between the chain and sprocket assembly and as the pressures remain substantially constant, there is no vibration and little wear in the chain and sprocket so as to provide a very smooth running chain.

It should be noted since only the forward convexly curved surfaces 48 of the sprocket teeth make driving contact with the chain tangs that it is not necessary that the rear faces 49 of the teeth be curved. The rear faces may easily be made flat if the sprocket is made by investment casting and thereby provide for greater space between the sprocket teeth so as to further premit the reduction of the sprocket diameter and weight.

In the chain shown all of the cutters and depth gauges are on an arc of the same radius, which when on the sprocket, the arc has its center at the center of the latter so that the chain can be sharpened in operation with a grinder or whetting member on the chain saw engine. For the 1½ inch diameter sprocket shown, the chain may have a pitch of 0.354 of an inch.

In FIGS. 5, 6 and 7, the sprocket shown has seven teeth 79, spaced between two disc members 82 and 83. This sprocket may have a diameter of 1.306 inches and also may be used to drive a chain having a pitch of 0.354 of an inch. The outer face 84 of the disc 83 has its surface in one plane in contrast to that shown in FIG. 3.

The sprocket is shown to be secured to the clutch drum 25 in the same manner as previously described. The discs 82 and 83 have axial thicknesses of 0.131 of an inch, and have chamfers at their outer peripheries of their inner faces as described above.

In the outer disc 83, there are openings 85 therethrough in alignment with the spaces between the teeth 79. At the axially innermost end of the openings, the configuration is circular, as at 88. The radially innermost surface 89 of each opening is substantially cylindrical and the same is true of the radially outwardly axially directed surface 90. Adjacent the outer face 84, a surface at 91 is convexly curved to enlarge the opening. In the annular direction, relative to a circle through the center of the openings 85, there are two axially directed, conical-shaped bevels 94 and 95, commencing at opposite annular or circumferential ends 96 and 97, respectively, enlarging the openings outwardly through the disc. Thus, here, the openings are enlarged a greater amount in the annular or circumferential direction than in the radial direction. It has been found that enlargement in the former direction is more effective to discharge sawdust from between the teeth than is enlargement in the latter direction. This greater enlargement in the annular direction permits more structural strength adjacent to the circumferential area of the disc member.

The sprocket shown in FIGS. 8 and 9 is the same as that shown in FIG. 5, except for the construction of the openings 100 extending through the outer disc member 101. The inner configuration of the openings is circular at 102 and the radially innermost portion is in axial alignment with the innermost portion of the space between the teeth at the root base. Axially outwardly of the radially innermost portion of each circle 102 is a cylindrical surface 103 concentric with the hub 104. The remainder of each opening 100 is enlarged outwardly in the form of a true conical bevel 106. Thus, these openings are enlarged in an outwardly radial direction the same amount as they are enlarged in the annular or the circumferential direction. For the specific structures shown, this makes a relatively large opening with approximately the least amount of necessary supporting structure in the hub and in the outer disc member.

In FIG. 10, there is shown the same sprocket and clutch drum as illustrated in FIG. 3. Here, the sprocket and drum are bearing mounted on the shaft 26 by means of the roller bearings 29 so as to float axially between a hardened steel thrust washer 109, which is adapted to abut against the nut 30, and a clutch rotor 110, having drum engaging shoes 111. The clearances on each side of the sprocket are approximately 0.030 to 0.040 of an inch and thus, the sprocket assembly is permitted to float approximately 0.080 of an inch on the shaft.

This arrangement automatically permits the sprocket to move itself into alignment with the bar groove 18, as shown in FIG. 2, with the aid of the guiding action of the sprocket groove entry angles at 59 and 60. Additional alignment clearance for the tangs is provided between the surfaces 55 and 56 on the disc members in the amounts of 0.003 to 0.007 of an inch. The conventional sprockets require an accurate alignment provided by means of shims. In contrast here, the sprocket and chain are self-aligning with the bar and the chain is positioned on the sprocket so that a maximum of bearing area is provided between the sprocket circumferential surfaces 41 and 42 and the bottom edges of the side links, particularly the longitudinal area 77.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific forms shown or uses mentioned except as defined in the accompanying claims, wherein various portions have been separated for clarity of reading and not for emphasis.

We claim:
1. A sprocket assembly for driving a chain, comprising:
(a) a pair of axially aligned spaced disc members;
(b) circumferentially spaced, radially directed sprocket teeth secured between said disc members;
(c) openings through at least one of said disc members extending laterally outwardly of the spaces between said teeth,
(d) said openings having beveled surfaces extending outwardly of the inner face of said disc member to substantially enlarge said openings at the outer face of said disc member,
(e) said openings at said outer face being larger in an annular direction, substantially concentric with the circumference of the disc member through the center of said openings, than in the radial direction through said center; and
(f) the disc member having said openings being relieved on its outer face outwardly from a central portion to reduce the axial thickness at the circumference and to reduce the axial length of said openings adjacent the circumference of the disc member.

2. In a chain saw of the type having an endless cutter chain and an engine-driven sprocket wheel operable to drive the chain through a cutting path, wherein the chain saw includes drive tangs carried by the cutter chain, which drive tangs are received within tang-receiving pockets which are circumferentially interspersed with sprocket teeth about a drive axis of the sprocket wheel, an improved structure for discharging cuttings from such tang-receiving pockets, said improved structure comprising:
converging inlets for said tang-receiving pockets having converging wall portions spaced longitudinally of the axis of rotation of the sprocket wheel and converging toward this axis to define a converging inlet for reeciving tangs and cuttings; and
diverging discharge passages for said tang-receiving pockets extending generally longitudinally of the axis of rotation of the sprocket wheel and transversely of said converging inlets, intersecting said tang-receiving pockets, and having diverging wall portions which diverge generally longitudinally of said axis and away from said pockets.

3. A chain saw as described in claim 2 further comprising:
circumferentially spaced wall portions defining an outlet for a discharge passage having a circumferential extent exceeding the radial extent of said outlet.

4. A chain saw as described in claim 2 further comprising:
mounting means for said sprocket wheel including a roller bearing assembly and abutments spaced axially of the axis of rotation of said sprocket wheel for supporting said sprocket wheel for limited axial movement along said axis to permit longitudinally, free-floating movement of the said tang-receiving pockets relative to said drive tangs.

5. A sprocket assembly for driving a chain, comprising:
(a) a pair of axially aligned spaced disc members;
(b) circumferentially spaced, radially directed sprocket teeth secured between said disc members; and
(c) openings through at least one of said disc members extending laterally outwardly of the spaces between said teeth,
(d) said openings being substantially circular at the inner face to substantially enlarge said openings at the outer face of said disc member.

References Cited
UNITED STATES PATENTS

| | | | |
|---|---|---|---|
| 2,678,569 | 5/1954 | Bremer | 74—243 |
| 2,854,294 | 9/1958 | Bannister | 74—243 X |
| 2,884,798 | 5/1959 | Wilson | 74—243 |
| 3,099,924 | 8/1963 | Armstrong | 74—243 |
| 3,163,052 | 12/1964 | Oehrli et al. | 143—32 X |
| 3,283,789 | 11/1966 | Silvan | 143—32 |

DONALD R. SCHRAN, Primary Examiner

U.S. Cl. X.R.
74—243